United States Patent
DallePezze et al.

(10) Patent No.: US 12,538,397 B2
(45) Date of Patent: Jan. 27, 2026

(54) CONTROLLING COLOR TEMPERATURE AND LUMINANCE IN LINEAR LED FIXTURES

(71) Applicant: AGS Lighting Management, LLC, Houston, TX (US)

(72) Inventors: Peter Angelo DallePezze, Houston, TX (US); Andrew Michael Svendsen, Lakewood, CO (US)

(73) Assignee: AGS Lighting Management, LLC, Houston, TX (US)

( * ) Notice: Subject to any disclaimer, the term of this patent is extended or adjusted under 35 U.S.C. 154(b) by 153 days.

(21) Appl. No.: 18/220,125

(22) Filed: Jul. 10, 2023

(65) Prior Publication Data

US 2023/0354490 A1 Nov. 2, 2023

Related U.S. Application Data

(63) Continuation of application No. 17/129,228, filed on Dec. 21, 2020, now Pat. No. 11,751,302.
(Continued)

(51) Int. Cl.
*H05B 45/20* (2020.01)
*F21V 23/00* (2015.01)
(Continued)

(52) U.S. Cl.
CPC ........... *H05B 45/20* (2020.01); *F21V 23/009* (2013.01); *F21V 23/04* (2013.01); *F21V 23/06* (2013.01);
(Continued)

(58) Field of Classification Search
CPC ..... H05B 45/20; F21V 23/0009; F21V 23/04; F21V 23/06; F21Y 2103/10
See application file for complete search history.

(56) References Cited

U.S. PATENT DOCUMENTS 7,014,336 B1 3/2006 Ducharme et al.
8,207,821 B2 6/2012 Roberge et al.
(Continued)

FOREIGN PATENT DOCUMENTS

KR 20190108511 A 9/2019

OTHER PUBLICATIONS

International Search Report and Written Opinion for PCT/US2021/061419, dated Mar. 24, 2022, 10 pages.
(Continued)

*Primary Examiner* — Alexander H Taningco
*Assistant Examiner* — Pedro C Fernandez
(74) *Attorney, Agent, or Firm* — Fletcher Yoder, P.C.

(57) ABSTRACT

A linear light-emitting diode (LED) lighting apparatus may include an array of light emitting diodes (LEDs) that may include a first plurality of LEDs that produces a first light having a first color temperature. The first plurality of LEDs aligns within a first linear shape. The second plurality of LEDs may produce a second light having a second color temperature different from the first color temperature. The second plurality of LEDs aligns within a second linear shape. The lighting apparatus may also include a driver circuit that outputs a plurality of currents and a switch assembly that may couple to the driver circuit. The switch assembly may include a first switch that may cause the driver circuit to output one of the plurality of currents and a second switch that may cause the one of the plurality of currents to couple to the first plurality of LEDs, the second plurality of LEDs, or both.

19 Claims, 5 Drawing Sheets

Related U.S. Application Data

(60) Provisional application No. 63/040,585, filed on Jun. 18, 2020.

(51) Int. Cl.
 *F21V 23/04* (2006.01)
 *F21V 23/06* (2006.01)
 *F21Y 103/10* (2016.01)
 *F21Y 113/13* (2016.01)
 *F21Y 115/10* (2016.01)

(52) U.S. Cl.
 CPC ....... *F21Y 2103/10* (2016.08); *F21Y 2113/13* (2016.08); *F21Y 2115/10* (2016.08)

(56) References Cited

U.S. PATENT DOCUMENTS

| | | | |
|---|---|---|---|
| 8,764,220 | B2 | 7/2014 | Chan et al. |
| 9,345,112 | B2 | 5/2016 | Chen |
| 9,719,642 | B1 | 8/2017 | Macias |
| 9,964,289 | B2 | 5/2018 | Pearson et al. |
| 9,995,440 | B2 | 6/2018 | Edwards |
| 10,085,314 | B1 * | 9/2018 | Milanesi ................. H05B 47/16 |
| 10,683,969 | B2 | 6/2020 | Jeswani et al. |
| 2004/0062041 | A1 | 4/2004 | Cross et al. |
| 2011/0116260 | A1 | 5/2011 | Kretschmann |
| 2017/0223800 | A1 | 8/2017 | Wu et al. |
| 2017/0314743 | A1 | 11/2017 | Del Castillo et al. |
| 2018/0209626 | A1 * | 7/2018 | Yadav ..................... H05B 45/20 |
| 2018/0231226 | A1 * | 8/2018 | Koo ........................ H05B 45/20 |
| 2019/0041009 | A1 | 2/2019 | May |
| 2019/0239298 | A1 * | 8/2019 | Bruckner ............... H05B 47/10 |
| 2019/0320515 | A1 | 10/2019 | Sadwick |
| 2019/0338895 | A1 * | 11/2019 | Jeswani .................. F21V 23/04 |
| 2020/0118482 | A1 * | 4/2020 | Jung ..................... G09G 3/3406 |
| 2020/0120775 | A1 * | 4/2020 | Doheny ................ F21V 23/001 |

OTHER PUBLICATIONS

Extended European Search Report for Application No. 21911861.9 mailed Oct. 28, 2024, 8 pages.

Light Efficient Design, "Ledbarkit-Internal Driver (LBI)," LBI Specification Sheet, Mar. 17, 2020, 19 pages.

Light Efficient Design, "LED Cast Episode-3," published on Apr. 1, 2020, https://youtu.be/STs6Bm0emFo?t=550.

Montes de Oca, Samantha, "CCT: Understanding the Basics," Super Bright LEDs Inc., https://www.superbrightleds.com/blog/what-is-cct-understanding-the-basics.html, Mar. 2, 2016, 4 pages.

Kay, Gregory, "Tunable white light and its benefits become more accessible," Architectural Products, https://www.arch-products.com/architectural-lighting/article/55092734/tunable-white-light-and-its-benefits-for-commercial-offices-become-more-accessible, Jun. 28, 2023, 9 pages.

Electronics Tutorials, "The Light Emitting Diode," https://www.electronics-tutorials.ws/diode/diode_8.html, previously accessed Aug. 21, 2025, 14 pages.

Tridonic, "Tunable White Technology At a Glance," LED Solutions, Mar. 2019, 13 pages.

Energy Star, "Program Requirements Product Specification for Decorative Light Strings," https://www.energystar.gov/sites/default/files/specs//private/spec_v1.5_draft.pdf, previously accessed Aug. 21, 2025, Eligibility Criteria, Version 1.5, 6 pages.

Energy Star, "Decorative Light Strings Specification Version 1.5," https://www.energystar.gov/products/spec/decorative_light_strings_specification_version_1_5_pd, Dec. 27, 2011, 2 pages.

* cited by examiner

CONTROLLING COLOR TEMPERATURE AND LUMINANCE IN LINEAR LED FIXTURES

CROSS-REFERENCE TO RELATED APPLICATION

This application is a continuation of U.S. patent application Ser. No. 17/129,228, filed Dec. 21, 2020, entitled "CONTROLLING COLOR TEMPERATURE AND LUMINANCE IN LINEAR LED FIXTURES," which claims priority from and the benefit of U.S. Provisional Application Ser. No. 63/040,585, entitled "LIGHTING APPARATUS AND METHOD OF USE," filed Jun. 18, 2020, which is hereby incorporated by reference in its entirety for all purposes.

BACKGROUND

The present disclosure relates generally to light fixtures. More specifically, the present disclosure relates to controlling a color temperature and luminance in a light fixture.

Traditional incandescent light bulbs provide a warm, yellow-colored light at a certain luminance (e.g., lumen output, amount of light). The color temperature of light produced by incandescent lights, which may be seen in home settings, generally falls within a certain range of color temperatures (e.g., 2000K-300K). Alternatively, fluorescent tubes, as commonly seen in warehouse and office settings, generally provide light with color temperatures (e.g., 5000K) that are relatively higher than incandescent lighting.

Light-emitting diodes (LEDs) use less energy and may be more energy efficient than incandescent lights and fluorescent lights. However, the light fixtures that employ LEDs may still be limited to a particular color temperature like their incandescent and fluorescent counterparts. As such, LED lighting systems that use light fixtures with LEDs tend to be custom manufactured to produce light at a specific color temperature and at a particular lumen output. That is, after the custom manufactured LED light fixtures are installed, the light produced from these fixtures is limited to a particular color temperature and one lumen output.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a linear light-emitting diode (LED) lighting apparatus may include an array of light emitting diodes (LEDs) that may include a first plurality of LEDs that produces a first light having a first color temperature. The first plurality of LEDs aligns within a first linear shape. The second plurality of LEDs may produce a second light having a second color temperature different from the first color temperature. The second plurality of LEDs aligns within a second linear shape. The lighting apparatus may also include a driver circuit that outputs a plurality of currents and a switch assembly that may couple to the driver circuit. The switch assembly may include a first switch that may cause the driver circuit to output one of the plurality of currents and a second switch that may cause the one of the plurality of currents to couple to the first plurality of LEDs, the second plurality of LEDs, or both.

In another embodiment, a linear light-emitting diode (LED) lighting system may include a first modular lighting apparatus traversing a first linear distance. The first modular lighting apparatus may include a first plurality of light-emitting diodes (LEDs) arranged within a first linear form factor and having a first number of LEDs, each LED of the first plurality of LEDS associated with a first color temperature. The first modular lighting apparatus may include a first driver circuit that may output a first plurality of currents and a first switch assembly and a first extender port. The first switch assembly may cause the first circuit to output one of the first plurality of currents and couple the one of the first plurality of currents to the first plurality of LEDs. The system may also include a second modular lighting apparatus traversing a second linear distance that is longer than the first linear distance, wherein the second lighting apparatus comprises a second plurality of light-emitting diodes (LEDs) arranged within a second linear form factor and having a second number of LEDs, each LED of the second plurality of LEDs associated with the first color temperature, such that the second number is greater than the first number by a scale factor. The second modular lighting apparatus may include a second driver circuit that may output a second plurality of currents and a second switch assembly. The second switch assembly may cause the second circuit to output one of the second plurality of currents and couple the one of the second plurality of currents to the second plurality of LEDs, such that the one of the second plurality of currents is greater than the one of the first plurality of currents by the scale factor. The second modular lighting apparatus may also include a second extender port that may couple with the first extender port to combine the first modular lighting apparatus and the second modular lighting apparatus to traverse the first linear distance and the second linear distance In yet another embodiment, a system may include a first modular lighting apparatus that may include a first array of light emitting diodes (LEDs). The first array of LEDs may include a first plurality of LEDs associated with a first color temperature. The first plurality of LEDs aligns within a first linear shape. The first lighting apparatus may also include a second plurality of LEDs associated with a second color temperature different from the first color temperature, such that the second plurality of LEDs aligns within a second linear shape. The first plurality of LEDs may include a first driver circuit that may output a first plurality of currents and a first switch assembly that may couple to the first circuit. The first switch assembly may include a first switch that may cause the first driver circuit to output one of the first plurality of currents and a second switch that may cause a first portion of the one of the first plurality of currents to couple to each LED of the first plurality of LEDs, cause the first portion of the one of the first plurality of currents to couple to each LED of the second plurality of LEDs, and cause half of the first portion of the one of the first plurality of currents to couple to each LED of the first plurality of LEDs and each LED of the second plurality of LEDs. The system may include a second modular lighting apparatus that may electrically couple to the first modular lighting apparatus. The second modular lighting apparatus may include a second array of the array of light emitting diodes (LEDs). The second array of LEDs may include a third plurality of LEDs associated with a third color temperature, such the third plurality of LEDs aligns within a third linear shape and the third color temperature matches the first color temperature. The third plurality of LEDs is longer than the first plurality of LEDs. The second modular lighting apparatus may include a fourth plurality of LEDs that may produce a fourth light having a fourth color temperature matching the second color temperature. The fourth plurality of LEDs aligns within a fourth linear shape, and the fourth plurality of LEDs is longer than the second plurality of LEDs. The second lighting apparatus may include a second driver circuit that may output a second plurality of currents and a second switch assembly that may couple to the second circuit. The second switch assembly may include a third switch that may cause the second circuit to output one of the second plurality of currents and a fourth switch. The fourth switch may cause a second portion of the one of the second plurality of currents to couple to each LED of the third plurality of LEDs, cause the second portion of the one of the second plurality of currents to couple to each LED of the fourth plurality of LEDs, and cause half of the second portion of the one of the second plurality of currents to couple to each LED of the third plurality of LEDs and each LED of the fourth plurality of LEDs.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
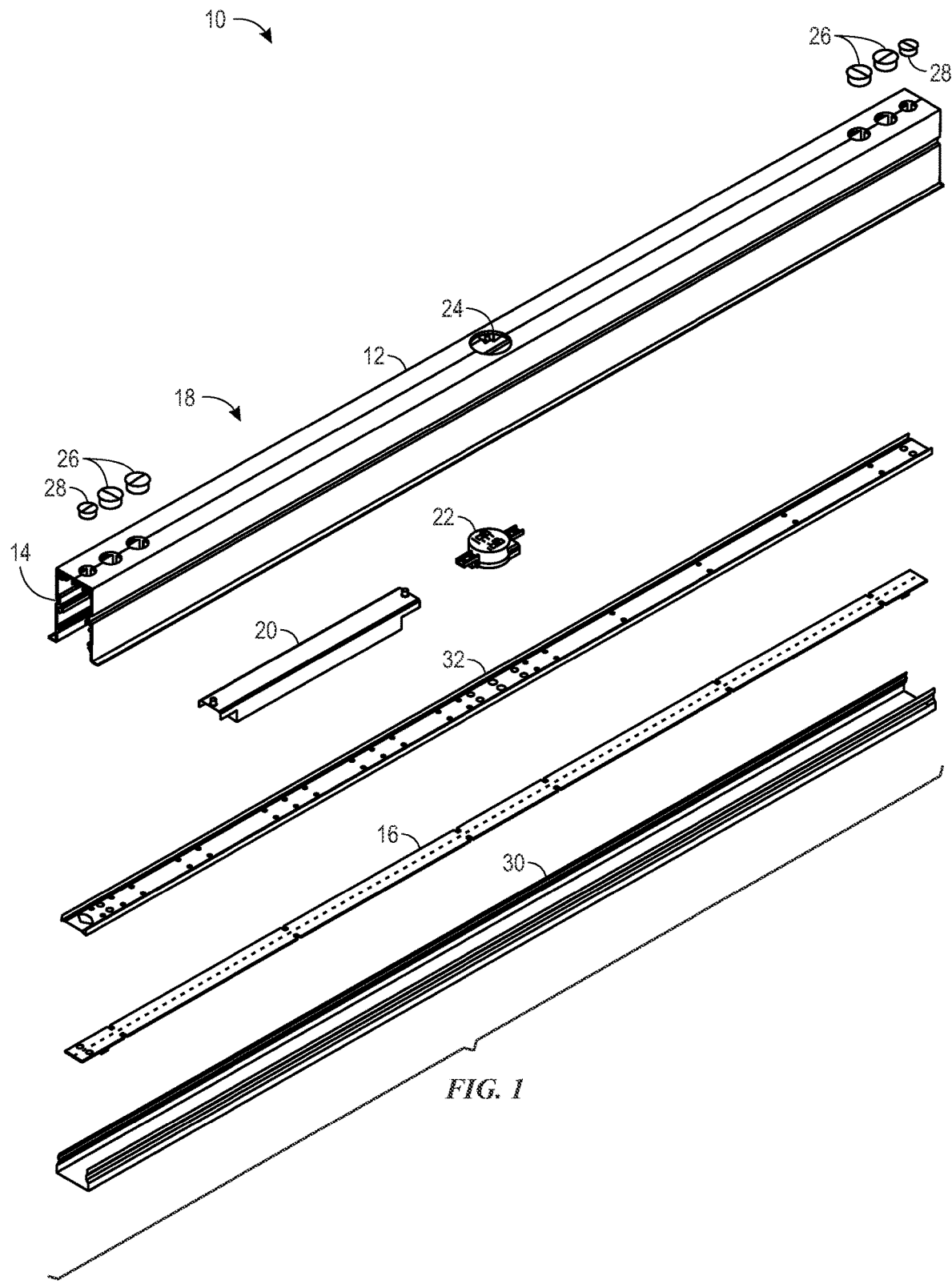
FIG. 1 is a perspective view of a linear light-emitting diode (LED) light fixture that includes a light-emitting diode (LED) array, in accordance with an embodiment of the disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As described above, light fixtures with LEDs may be limited in that they produce light at one particular color temperature and one particular luminance or lumen output level. For certain environments or settings, linear LED light fixtures (e.g., light fixtures that include LEDs disposed in a linear shape) are desired to produce efficient light for large spaces. For example, in factory or office settings, linear light fixtures are fixed on a ceiling and linearly traverse the setting to produce light within the space below. To ensure that the light provided in the space below is uniform in color and luminance, each light fixture may be custom manufactured according to a desired color temperature and luminance level. In addition, since every setting has unique dimensions and lengths, the custom-manufactured linear light fixture may use a custom number of LEDs (e.g., each LED having desired color temperature) positioned in a custom-length LED array powered by a custom-built driver circuit to provide a sufficient amount of current to each LED of the LED array, thereby producing the desired luminance level. Manufacturing these linear LED light fixtures involves designing a different version of the linear LED light fixtures with specially designed components for each different setting.

With this in mind, the present disclosure describes a linear light fixture including a switch assembly that may control the color temperature and the luminance output of an array or collection of light-emitting diodes (LEDs) within the light fixture. As described herein, the linear light fixture, which may be formed from an assembly of multiple light fixture modules, may include an array of LEDs that may facilitate provision of an uninterrupted and continuous illuminated linear surface. As such, the LED array within the linear LED light fixture may include a number of LED chips or circuits positioned in a linear manner. In addition, each LED chip may receive current from one or more driver circuits that provides each LED chip with a substantially equal amount of current to cause each LED to illuminate at the same luminance level.

To control the color temperature output of the linear LED light fixture, the light fixture may include multiple strings of LEDs in the LED array that produce light at multiple color temperatures. That is, for example, the linear LED light fixture may include two distinct linear strings of LEDs, such that one linear string of LEDs has a first color temperature, meaning it produces light at one color temperature (e.g., 3000 Kelvin), and a second linear string of LEDs has a second color temperature, meaning it produces light at another color temperature (e.g., 4000 Kelvin). Reference to producing light at a particular color temperature generally means producing light within a range approximate a color temperature value. For example, a color temperature of 4000

Kelvin refers to a range of values that approximate 4000 Kelvin within tolerances. In some embodiments, a switch assembly coupled to the array of LEDs may direct current from the driver circuit to one of the two linear strings of LEDs to cause the linear LED light fixture to produce light with the corresponding color temperature. That is, the switch assembly may include a switch that causes current output by the driver circuit to be directed to a particular linear string of LEDs within the linear LED light fixture based on a correspondence between a desired color temperature of light to be provided and a color temperature range of the particular linear string of LEDs. For example, a first string of LEDs may have a color temperature of 3000 Kelvin and a second string of LEDs may have a color temperature of 4000 Kelvin, and the first string may be selected for activation while the second string remains idle because the desired lighting color temperature is 3000 Kelvin.

In addition to controlling the color temperature of the light produced by the linear LED light fixture, in some embodiments, the switch assembly may include an additional switch to control a luminance or a lumen level output by the linear LED light fixture. The lumen level output of an LED may depend on the amount of current it receives. That is, as the current provided to the LED increases, the amount of luminance produced by the light output by the respective LED increases. With this in mind, the additional switch may cause the driver circuit to output a certain amount of current, which may be directed to each LED in the linear array of LEDs of the linear LED light fixture.

By including the ability to control the color temperature and luminance of the LED arrays, the linear LED light fixtures may be manufactured as light fixture modules with various lengths such that each module may coordinate with other modules to form larger modules or operate separately as independent light fixtures. Indeed, each light fixture module and the components (e.g., LED array, driver circuit) therein may be manufactured according to a scale factor (e.g., ½, 1, 2, 3) of a base light fixture module having a certain length or a having a different number of LEDs in the LED array. For example, an 8-ft light fixture module may be similar to that of a 4-ft light fixture module in that the components that make up the 4-ft light fixture module are scaled by a factor of 2 in the 8-ft light fixture module because the 8-ft fixture module may include twice as many LEDs in its respective LED array 16 as compared to the 4-ft light fixture module. With this example in mind, the driver circuit of the 8-ft linear LED light fixture module may output twice the amount of current that the driver circuit of the 4-ft linear LED light fixture module may output. In the same manner, the number of LEDs in the LED array 16 of the 8-ft linear LED light fixture module may be twice the number of LEDs in the LED array 16 of the 4-ft linear LED light fixture module. In this way, a ratio of the current output by the driver circuit of the 4-ft light fixture module to the current output by the driver circuit of the 8-ft light fixture module may match a ratio of the number of LEDs in the 4-ft light fixture module to the number of LEDs in the 8-ft light fixture module. As a result, the linear LED light fixture modules may be manufactured at fixed lengths and then assembled or used individually to provide lighting solutions for different spaces of different sizes, while providing consistent light properties with the same color temperature and luminance properties regardless of the sizes or combinations of the linear LED light fixture modules used in the space. In this way, manufacturers may efficiently produce linear LED light fixtures at various fixed scales to accommodate different sized spaces without customizing components for linear LED light fixtures for every different space. Additional details with regard to controlling the color temperature and luminance properties of light produced by linear LED light fixtures will be discussed in more detail below with reference to FIGS. 1-6.

By way of introduction, FIG. 1 illustrates a perspective exploded view of a linear LED light fixture 10 and components that make up the linear LED light fixture 10, in accordance with an embodiment of the present disclosure. The linear light fixture 10 may represent an assembly of multiple light fixture modules or a single light fixture module. As shown in FIG. 1, the linear LED light fixture 10 may include a housing 12 that may be fixed to or suspended from a ceiling or other part of a structure to secure the linear LED light fixture 10. The housing 12 may be composed of aluminum, such as an extruded aluminum, a stamped aluminum, and the like. It should be noted that the housing may be composed of another metal (e.g., steel) other than aluminum, a suitable plastic, carbon fiber, a polycarbonate material, a composite material, and other materials that may form the desired shape and house the depicted components. In a particular embodiment, the housing 12 may be designed to securely hold an illumination surface (e.g., a translucent panel configured to be backlit by LEDs) that is less than or equal to six inches wide and greater than or equal to 24 inches in length.

The housing 12 may include an interior volume 14 in which various components of the linear LED light fixture 10 may be stored or placed within. For example, an LED array 16 may be positioned within the interior volume 14 to produce light directed away from a base 18 of the housing 12. The LED array 16 may include a number of LED chips or circuits disposed on one or more strips (e.g., LED strip), each of which includes one or more LEDs that receives electricity (e.g., current) and produces light that may be distributed to areas underneath the linear LED light fixture 10. To enable the housing 12 to contain an illuminated surface that is less than or equal to six inches wide and greater than or equal to 24 inches in length, the LED strips disposed in the housing may be greater than or equal to 24 inches in length to match that of the housing 12. In one embodiment, the LEDs of the LED array 16 may be disposed on one or more strips of LEDs, such that each LED is of the same type (e.g., color temperature) and equally spaced from each other. For instance, the LEDs of a particular strip of LEDs in the LED array 16 may produce light having the same color temperature. The LED strip may be arranged to form the shape of a line that extends along a length of the housing 12. In some embodiments, each LED strip may include at least one connector such that an additional LED strip may be added at one or either side of the respective LED strip. One or both sides of the housing 12 may include an electrical connector to provide power to the components of the linear LED light fixture 10 or to adjacently connected linear LED light fixtures (e.g., light fixture modules) in accordance with the embodiments described herein.

The LED array 16 may receive electricity via a driver circuit 20 and/or a switch assembly 22. In one embodiment, the driver circuit 20 may be a constant current mode output driver that produces multiple levels of current for output using a current regulator circuit or the like. By way of example, the driver circuit 20 may receive an input voltage (e.g., 120-277 VAC) and output currents at 803 mA, 1250 mA, or 1660 mA based on an input signal provided by the switch assembly 22. That is, the switch assembly 22 may send a control signal (e.g., resistance signal, light signal, electrical signal) that causes the driver circuit 20 to output a certain amount of current. Although the driver circuit 20 is described as operating at certain input voltages and providing certain output currents, it should be noted that the provided values are exemplary values and the driver circuit 20 may receive and output voltage and current at various levels and values.

The switch assembly 22 may provide a signal to the driver circuit 20 to cause the driver circuit 20 to output a current that may be directed to the LED strings within the LED array 16. As shown in FIG. 1, the switch assembly 22 may be inserted into the housing 12 and maintained in place by a receptacle 24 (e.g., an edge formed in the housing 12 about a hole) sized to house the switch assembly 22. In addition to the receptacle 24, two plugs 26 (e.g., ⅞-inch diameter) and a single plug 28 (e.g., ⅝-inch diameter) may be positioned at each end of the housing 12. The plugs 26 and 28 may be used to route wires and/or cable to the interior volume 14 of the housing 12. For example, a wire for providing power to the driver circuit 20 may be routed through one of the plugs 26 or 28. In addition, wires that may provide voltage for a number of other linear LED light fixtures that may be positioned adjacent to each other and may be routed between each other via the plugs 26 or 28.

The interior volume 14 may also include a lens 30 that may control the distribution of beams of light produced by the LEDs of the LED array 16. The lens 30 may include retaining or coupling components, such that the lens 30 can be pressure fit within the housing 12 with no further mechanical attachments. In addition, the interior volume 14 may also include a reflector 32 positioned above the LED array 16 to alter, reflect, or diffuse the beams of light produced by the LEDs of the LED array 16.

As will be discussed with reference to FIG. 4, the linear LED light fixture 10 may be manufactured according to a modular type design. Thus, two of the linear LED light fixtures 10 may be connected together to make a longer linear continuous run. In accordance with present embodiments, any suitable number of linear LED light fixtures 10 (or light fixture modules 10) can be added together (e.g., attached end to end) to accommodate a corresponding length for a desired completed light fixture.

Figure 2:
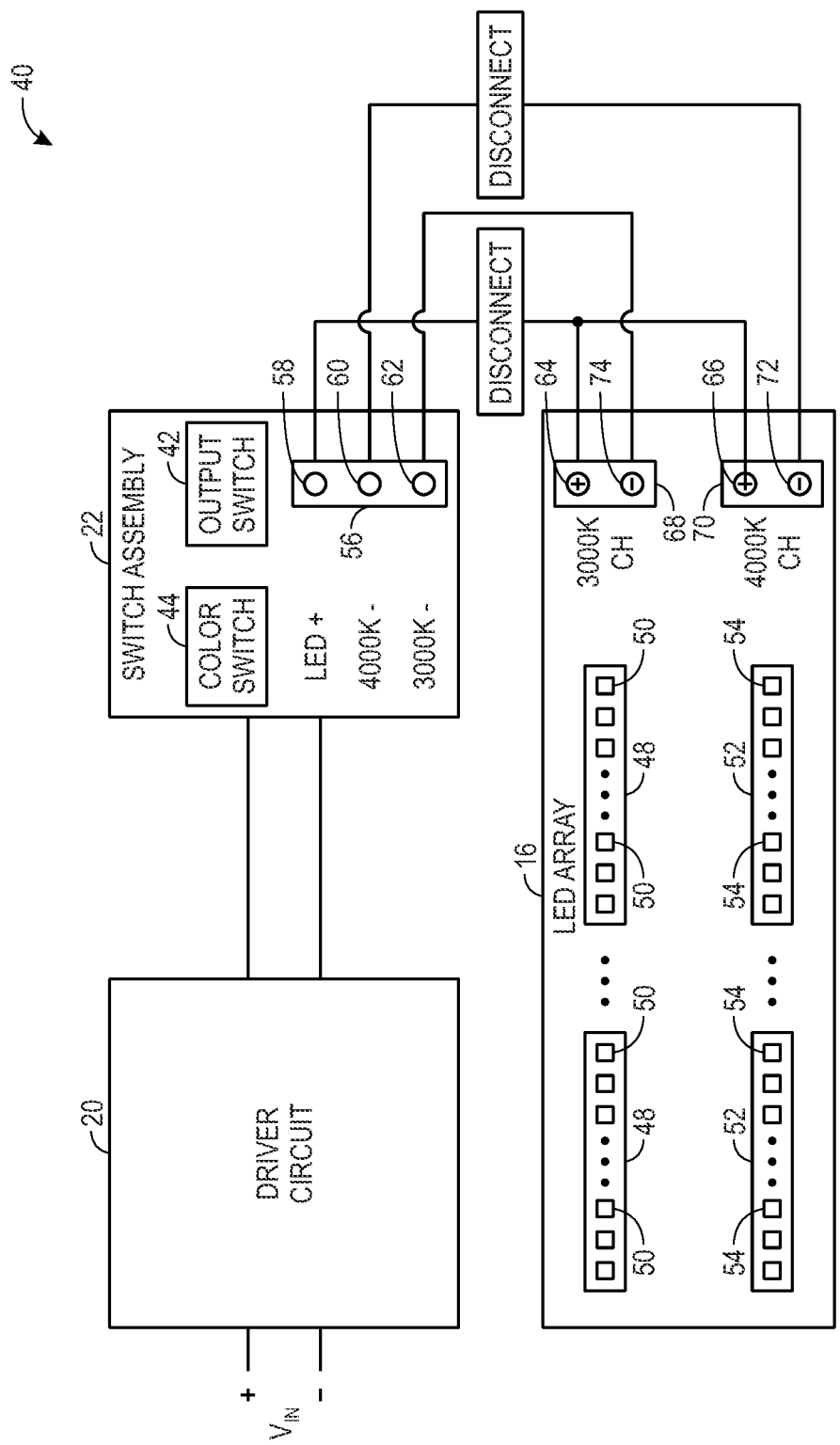
FIG. 2 is a block diagram of electrical connections between a driver circuit, a switch assembly, and the LED array within the light fixture of FIG. 1, in accordance with an embodiment of the disclosure.

With the foregoing in mind, FIG. 2 illustrates a block diagram of an electrical assembly 40 depicting interconnections between components of the linear LED light fixture 10. As shown in FIG. 2, the electrical assembly 40 may include the driver circuit 20, the switch assembly 22, and the LED array 16. The driver circuit 20, as discussed above, may receive an input voltage (Vin) and output multiple direct current (DC) currents. The switch assembly 22 may provide a control signal to the driver circuit 20 to cause the driver circuit 20 to output a particular DC current. By way of example, the driver circuit 20 may output three different DC currents depending on the control signal received from the switch assembly 22.

The switch assembly 22 may include an output switch 42 and a color switch 44. In one embodiment, the output switch 42 may be a mechanical switch that moves to three different positions. When the output switch 42 is positioned at a particular position, a control signal may be provided to the driver circuit 20, which may include a processor or other suitable control circuitry, to cause the driver circuit 20 to output a corresponding DC current value. For example, the output switch 42 may have three different positions associated with causing the driver circuit 20 (e.g., via the processor or control circuitry) to output three different DC current values. Thus, the output switch 42 may coordinate with the driver circuit 20 to provide any of the three different DC current values depending on the desired operation.

The switch assembly 22 may be electrically coupled to the LED array 16. The LED array 16 may include one or more LED strings 48, each of which form a linear shape and is composed of a number of LEDs that produce light at a particular color temperature. By way of example, the LED array 16 may include a first set of LED strings 48 that include LEDs 50 producing light at a color temperature of 3000K and a second set of LED strings 52 positioned parallel to or interlaced with the first set of LED strings that include LEDs 54 producing light at a color temperature of 4000K. Although the LED array 16 is illustrated and described herein as including two sets of LED strings, it should be noted that the LED array 16 may include any suitable number of LED strings to provide a variety of different color temperatures in accordance with the embodiments described herein.

Referring to the block diagram of FIG. 2, the switch assembly 22 may include a terminal 46 that may include one positive terminal 58 and two negative terminals 60 and 62. The positive terminal 58 may be electrically coupled to (e.g., via wire, circuit trace) positive terminals 64 and 66 of terminal blocks 68 and 70, respectively. The negative terminal 60 may be electrically coupled to terminal 72 of the terminal block 70, and the negative terminal 62 may be electrically coupled to terminal 74 of the terminal block 68.

By way of operation, the driver circuit 20 may provide a DC current at the selected level (e.g., according to the output switch 42) to the switch assembly 22. The switch assembly 22 may, in turn, direct the DC current to the LED strings 48 or the LED strings 52 depending on a position of the color switch 44. That is, the color switch 44 may include multiple selectable positions that correspond to different color temperatures. By way of example, the color switch 44 may include three positions that respectively correspond to color temperatures of 3000K, 3500K, and 4000K. Depending on the position of the color switch 44, the switch assembly 22 may direct the DC current output by the driver circuit 20 to the LED strings 48, the LED strings 52, or both LED strings 48 and 52 to cause the linear LED light fixture 10 to produce light at 3000K, 4000K, or 3500K, respectively.

For instance, if the color switch 44 is positioned at the 3000K level, the switch assembly 22 may direct the DC current output by the driver circuit 20 to the LED strings 48 via the terminals 64 and 74 of terminal block 68. If the color switch 44 is positioned at the 4000K level, the switch assembly 22 may direct the DC current output by the driver circuit 20 to the LED strings 52 via the terminals 66 and 72 of terminal block 70. By directing the DC current to the LED strings 48 or the LED strings 52, the linear LED light fixture 10 may produce light at a color temperature of 3000K or 4000K, respectively. With the foregoing in mind, to produce light at a color temperature of 3500K, the switch assembly 22 may direct the DC current output by the driver circuit 20 to both of the LED strings 48 and 52. That is, half of the DC current output by the driver circuit 20 may be provided to the LED strings 48 and the other half of the DC current output by the driver circuit 20 may be provided to the LED strings 52. As a result, the color temperature of the resulting light output by the LEDs 50 and 54 of the LED strings 48 and 52 may be 3500K or the average of 4000K and 3000K.

In addition, depending on the position of the output switch 42, the linear LED light fixture 10 may produce light with different luminance values depending on the DC current level output by the driver circuit 20. That is, the particular LED string 48 or 52 or combination of LED strings 48 and 52 that receives the DC current may illuminate to a particular luminance level depending on the DC current provided by the driver circuit 20, but the color properties of the respective LEDs 50 and 54 do not change based on the different received DC currents. Moreover, when the DC current output by the driver circuit 20 is split between the LED strings 48 and 52, half of the DC current output by the driver circuit 20 is provided to twice as many LEDs, as compared to when all of the DC current is provided to one LED string. As a result, the luminance provided by the LEDs in the LED strings 48 and 52 receiving half of the DC current is the same as the luminance output by the LEDs of one of the LED strings 48 or 52 that receives all of the DC current from the driver circuit 20.

To produce the same color and luminance across each LED of a respective LED string, each of the LEDs in the LED strings is arranged or positioned in a manner to receive an equal amount of current. That is, the DC current received at the LED array 16 is evenly distributed across each LED of the respective LED string, such that each LED illuminates to a particular lumen level. Indeed, the LED strings 48 and 52 are disposed along corresponding circuits to split the current (e.g., via current dividers, voltage dividers) received from the driver circuit 20 equally among each LED of the respective LED string. As a result, the collective light produced by the LEDs of the respective LED string corresponds to a desired lumen level selected via the output switch 42. As such, the driver circuit 20 may be sized or selected based on the number of LEDs that are present in the LED array 16. For example, if the output switch 42 for the linear LED light fixture 10 is positioned (e.g., low level) such that the driver circuit 20 outputs 415 mA, and if the LED array 16 includes 6 LED strings 48 and each LED string 48 includes 16 LEDs 50 (i.e., 96 total LEDs), each LED 50 of the LED strings 48 may receive approximately 4.32 mA.

Keeping this in mind, to produce a linear LED light fixture 10 that is twice as long as provided in the example above, the driver circuit 20 may be scaled by 2 to provide twice the DC current output and the number of LED strings may be doubled, such that twice as many LEDs (e.g., 192 total LEDs) is included in the respective LED array 16. As a result, the driver circuit 20 may be scaled to provide 830 mA of DC current at the same position (e.g., low level) that the switch assembly 22 is positioned in the previous example. In turn, each LED 50 of the 192 total LEDs may receive 4.32 mA of DC current, thereby producing the same amount of luminance as provided in the LEDs described in the example above.

Figure 3:
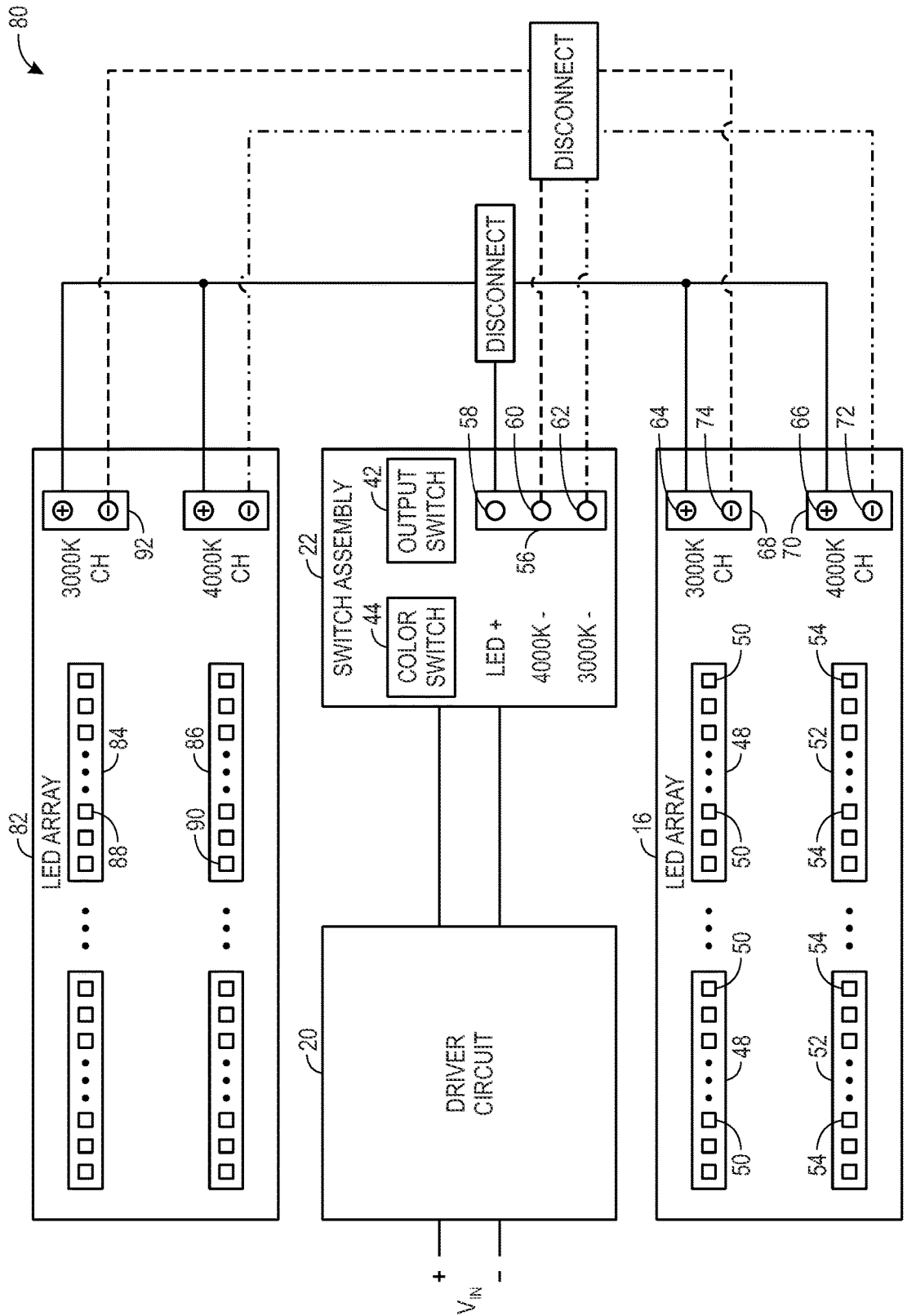
FIG. 3 is a block diagram of electrical connections between a driver circuit, a switch assembly, and two LED arrays within the light fixture of FIG. 1, in accordance with an embodiment of the disclosure.

With this in mind, FIG. 3 illustrates a block diagram of an electrical assembly 80 depicting the interconnections between component parts of the linear LED light fixture 10 that includes twice as many LEDs as the electrical assembly 40 illustrated in FIG. 2. As shown in FIG. 3, the LED array 16 is electrically coupled to the switch assembly 22 in the same manner as provided in the electrical assembly 40 of FIG. 2. In addition to the LED array 16, the switch assembly 22 may also be electrically coupled to an LED array 82, which may be similar to the LED array 16. In this way, the DC current received by the LED array 82 may be equally distributed to LED strings 84 and 86, as well as LEDs 88 and 90, respectively.

Referring to the wiring of the electrical assembly 80, the LED array 82 and the LED array 16 are connected to the switch assembly 22 such that the DC current received from the driver circuit 20 is split equally between two respective LED strings depending on the setting of the color switch 44. That is, if the color switch 44 is set at the 3000K setting, the DC current may be provided to terminal blocks 64 and 92, thereby illuminating the LED strings 48 and 84. When connected to the LED arrays 16 and 82, the DC current output by the driver circuit 20 will be split equally between the LED array 16 and the LED array 82. As such, to ensure that the color and luminance properties of the linear LED light fixture 10 having one LED array and the linear LED light fixture 10 having two LED arrays match each other, the power rating (e.g., wattage) of the driver circuit 20 of the electrical assembly 80 may be scaled by 2. If the driver circuit 20 of the electrical assembly 40 outputs 415 mA when the output switch 42 is set at a particular position, the driver circuit 20 of the electrical assembly 80 may be designed to output 830 mA when the output switch 42 is set at the same position. By scaling the number of LEDs and the DC current output of the driver circuit 20 in the linear LED light fixture 10 depicted in the electrical assembly 40 in the manner described above, various modules of linear LED light fixtures can be manufactured, such that each module may provide the same color and luminance properties regardless of the size (e.g., length) of the module. As a result, manufacturing operations related to producing the linear LED light fixtures may be simplified. That is, manufacturers may supply a number of linear LED light fixtures to accommodate a desired length by connecting multiple linear LED light fixture modules together while maintaining a consistent color temperature and luminance across the collection of linear LED light fixture modules.

Figure 4:
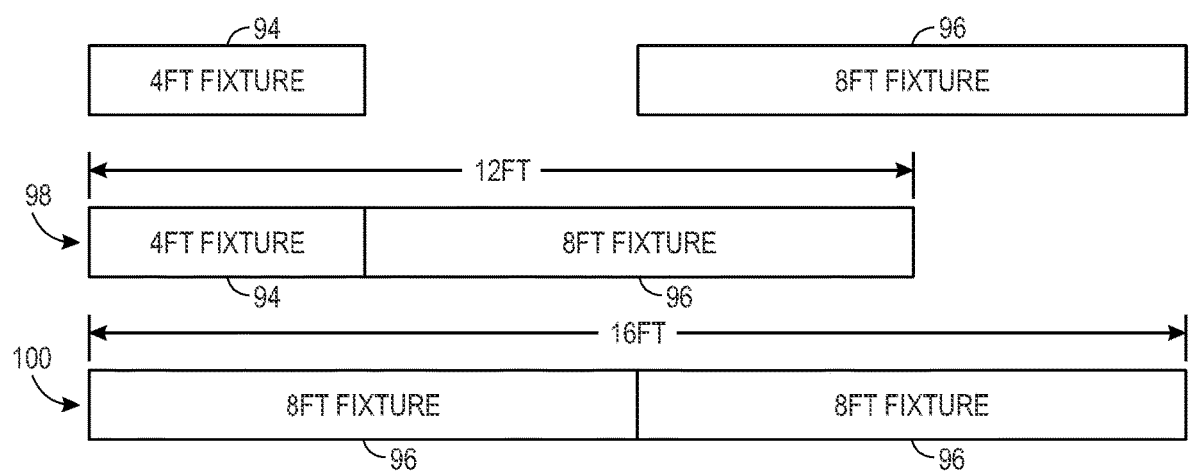
FIG. 4 illustrates several configurations for different modules of the light fixture of FIG. 1, in accordance with an embodiment of the disclosure.

Keeping this in mind, FIG. 4 illustrates various combinations of 4-ft and 8-ft linear LED light fixture modules that enable a user to achieve 4-ft (94), 8-ft (96), 12-ft (98), and 16-ft lengths (100) using just two types of linear LED light fixtures (94 and 96). In some embodiments, the housing 12 of each linear LED light fixture module may be positioned adjacent to each other and may include coupling features that allow each housing to physically and electrically connect to each other. In addition, in some embodiments, each end of the linear LED light fixture modules may include electrical connections that allow input voltage provided at one electrical connection to be distributed in parallel to another electrical connection at the other end of the linear LED light fixture module. In this way, the same input voltage may be provided to each linear LED light fixture module via an adjacently connected linear LED light fixture module.

In addition to the lengths of the linear LED light fixture modules depicted in FIG. 3, it should be understood that other linear LED light fixture modules having other lengths may also be manufactured according to the scale factors described above. As such, the embodiments described herein may be used to manufacture linear LED light fixture modules to fit any desired length.

Figure 5:
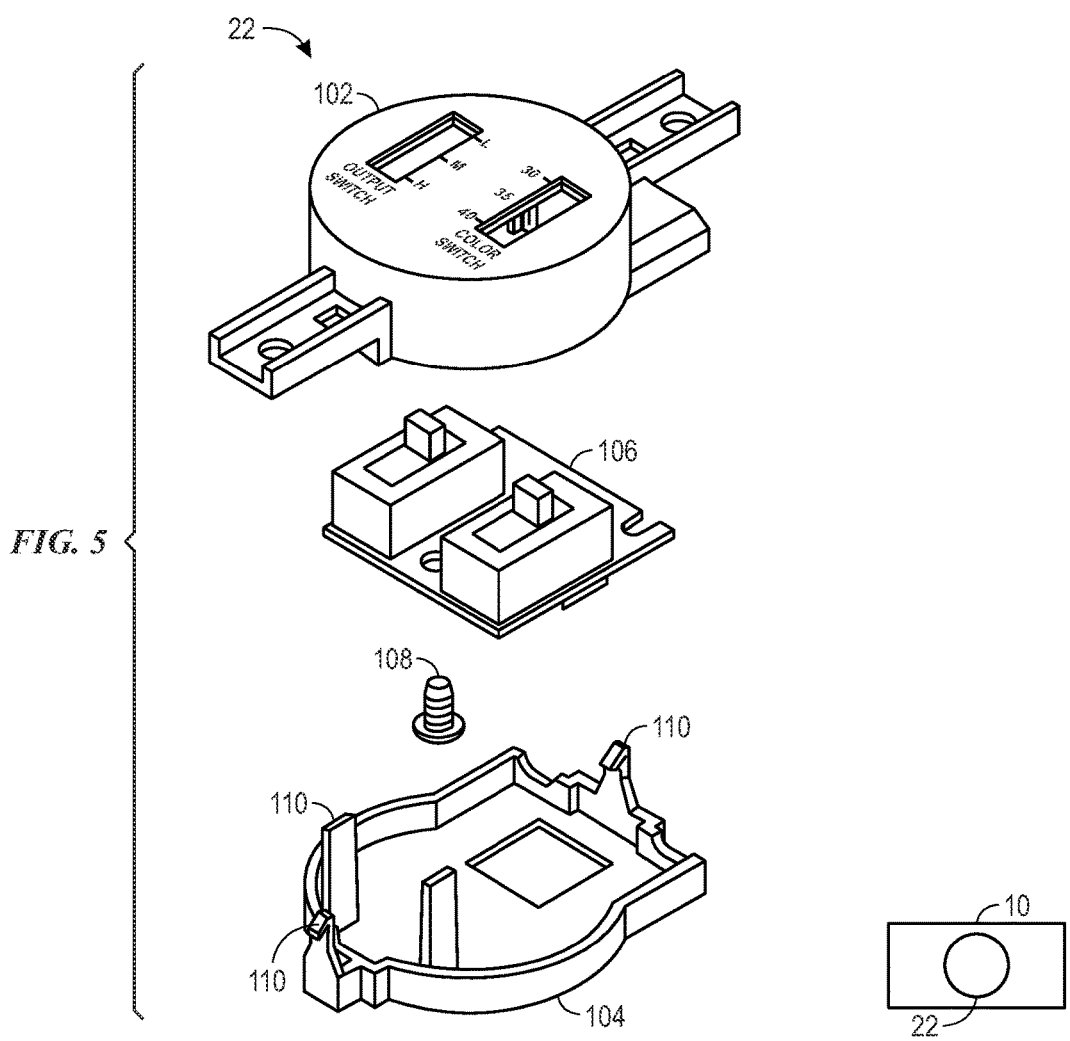
FIG. 5 is an expanded perspective view of a switch assembly within the light fixture of FIG. 1, in accordance with an embodiment of the disclosure.

Returning to the figures, FIG. 5 illustrates an exploded view of the switch assembly 22, which may be incorporated into a linear LED light fixture in accordance with present embodiments. In some embodiments, the switch assembly may include a top portion 102, a bottom portion 104, a switch circuit 106, and a connecting mechanism 108. By way of example, the switch circuit 106 may include the output switch 42 and the color switch 44 described above. In one embodiment, the switch circuit 106 may include two adjustable pins, where each pin may move to a number of fixed positions. In the illustrated example, the switch circuit 106 may include slide switches that move to fixed positions. It should be noted that the switch circuit 106 may use any suitable form of switch configuration, such as a push button switch, rotary switch, toggle switch, a dip switch, and the like. In some embodiments, the switch circuit 106 may include a processor, a transceiver, and other circuit components that may enable the switch circuit 106 to receive electrical or wireless signals to control the operation of the switch circuit 106.

By way of example, a first adjustable switch of the switch circuit 106 may adjust a color temperature level between a low level, a medium level, or a high level. As mentioned above, the levels may be adjusted between 3000K, 3500K, and 4000K, as per the electrical assemblies described above. Again, it should be noted that such levels are merely examples and the linear LED light fixture 10 may be modified to provide a variety of color temperatures by using different LEDs that provide light with different color temperatures.

As discussed above, the switch circuit 106 may provide a control signal to the driver circuit 20 to actuate the LED array 16 based on a position of the output switch 42. After sending the control signal to the driver circuit 20, the switch circuit 106 may receive electrical energy from the driver circuit 20 and route the electrical energy to the LED array 16 in accordance with the selection of the color switch 44. As such, the switch circuit 106 may include circuit components that adjust the path of the electrical energy output by the switch circuit 106 depending on the position of the color switch 44.

The connecting mechanism 108 may represent any suitable coupling component that may secure the switch circuit 106 to the top portion 102, such as a pan head screw. In some embodiments, the top portion 102 and the bottom portion 104 may be secured to each other using coupling features 110 that may snap or attach to hooks (not shown) disposed in the top portion 102. It should be noted that the top portion 102, the bottom portion 104, and the switch circuit 106 may be coupled to each other using any suitable fastener or technique.

Figure 6:
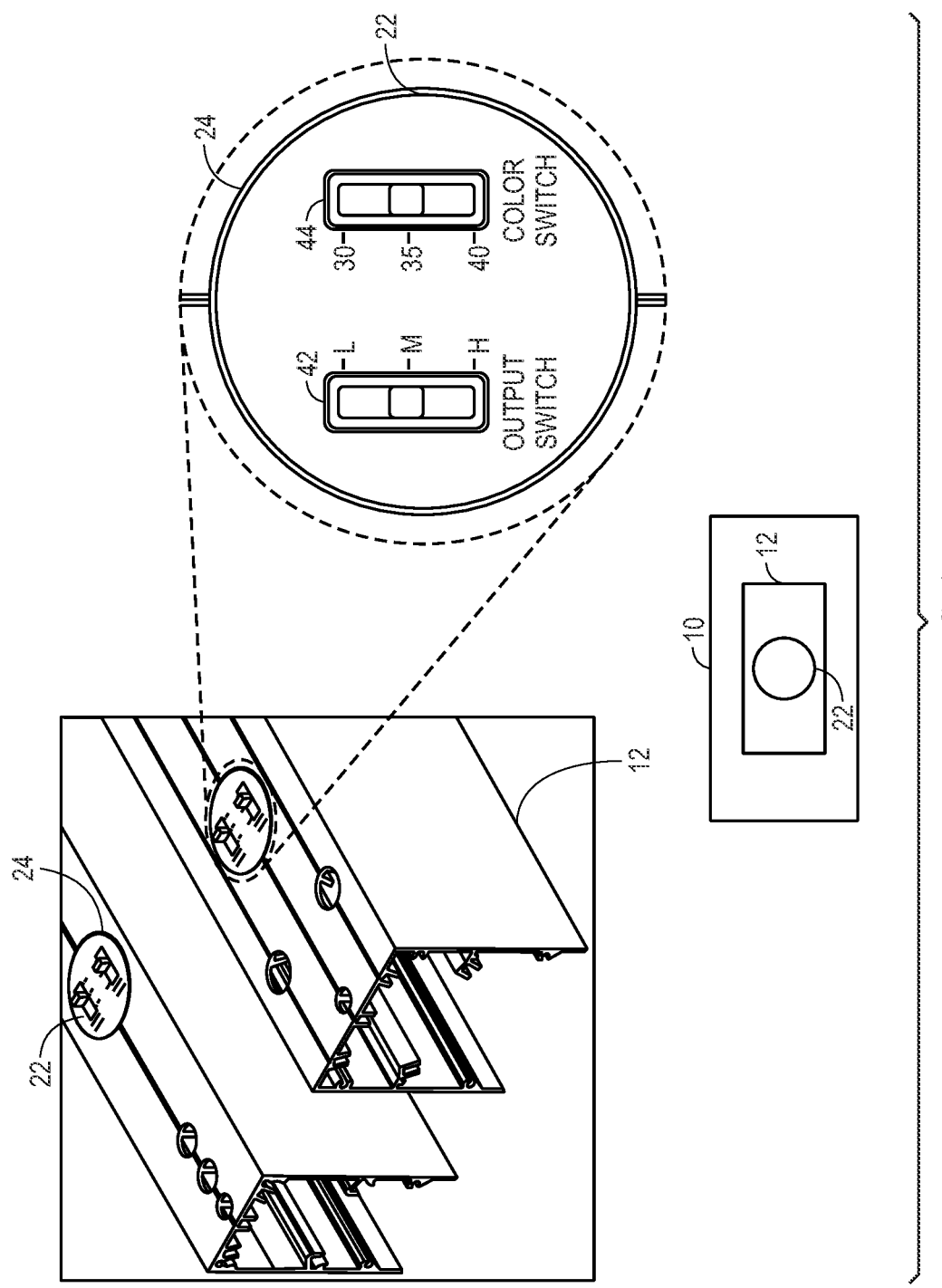
FIG. 6 is a perspective view and a top view of the switch assembly of FIG. 5 positioned within a housing assembly of the light fixture of FIG. 1, in accordance with an embodiment of the disclosure.

Referring back to FIG. 1, the switch assembly 22 may be positioned in the receptacle 24 of the housing 12. For example, FIG. 6 illustrates a perspective view and a top view of the switch assembly 22 placed in a hole defined by the receptacle 24. As shown in FIG. 6, the switch assembly 22 may be fixed within the receptacle 24, such that it is flush or level with the surface of the housing 12. The output switch 42 and the color switch 44 may thus be accessible on the outside of the housing 12 to allow users to move the selectable switches of the output switch 42 and the color switch 44.

Keeping the foregoing in mind, in some embodiments, the driver circuit 20 may automatically adjust its output current to provide a consistent luminance across connected linear LED light fixtures. Thus, present embodiments may adjust to a number of assembled modules. For instance, the driver circuit 20 may include an adjustable current regulator that provides a range of DC current outputs. As such, the driver circuit 20 may be used to control the luminance of a variety of lengths of the linear LED light fixtures having a variety of number of LEDs. For example, in one embodiment, the driver circuit 20 may include a processor or other suitable processing core complex that may automatically adjust the DC current output to the switch assembly 22 using the current regulator based on the number of LED strings or LEDs present on the LED array(s) 16 within the respective linear LED light fixture 10 and the other linear LED light fixtures 10 that may be connected to the respective linear LED light fixture 10. For instance, in one embodiment, the processor of a first driver circuit 20 may receive a first dataset indicative of a number of LEDs that are part of a first linear LED light fixture 10 of which the first driver circuit 20 is used to power. The first dataset may be stored in a memory or storage component that may be part of the first linear LED light fixture 10. The storage may include data regarding manufacturing details regarding the linear LED light fixture 10, such as the number of LEDs, the color temperature of each LED, the power characteristics of the respective driver circuit, a serial number, other identifying information, and the like.

After receiving the first dataset, the processor may broadcast a request for data to other processors that are part of other linear LED light fixtures. In some embodiments, each linear LED light fixture may electrically connect to an adjacent linear LED light fixture to facilitate distribution of power and to facilitate communications therebetween. Each driver circuit 20 may include a processor and a communication component that may allow data to be exchanged between each other.

The request for data may include a request for information regarding a number of LEDs that are part of other linear LED light fixtures 10 that may be electrically and/or communicatively connected (e.g., wired, network, wireless) to the first driver circuit 20. In addition to data regarding the number of LEDs that are part of the other LED light fixtures 10, the processor may also request data regarding the power (e.g., current output, wattage) capabilities of other driver circuits.

After receiving datasets indicative of the number of LEDs and power capabilities of the other linear LED light fixtures, the processor may determine output settings for each driver circuit in each connected linear LED light fixture to provide a consistent luminance across each of the connected linear LED light fixtures. That is, if each driver circuit includes a current regulator, the processor may determine a DC current value that each LED of all of the connected linear LED light fixtures may receive to provide a consistent luminance across all of the connected linear LED light fixtures. After determining the DC current value, the processor may send a signal to the current regulator of the driver circuit 20 and to each of the other driver circuits in the other linear LED light fixtures that cause the respective driver circuits to output a DC current value that causes the respective LEDs of the respective linear LED light fixtures to receive the same current value. In this way, the processor may automatically calibrate the luminance of the connected linear LED light fixtures to maintain a consistent luminance regardless of the length of the respective linear LED light fixture.

By employing the various systems and techniques described above, a user of the linear LED light fixture may modify a lumen output and/or color temperature of a string of LEDs based upon a user's preferences. In addition, by employing multiple linear LED light fixtures (light fixture modules) assembled together, a user may provide the ability to equip a certain setting with an uninterrupted, continuous surface of light that has consistent color and luminance properties at a variety of lengths. Moreover, manufacturers of the linear LED light fixture modules may efficiently produce linear LED light fixtures to allow their customers to create custom length linear LED light fixtures that have the same lumen output and/or color temperature selectable by the customer.

It should be noted that, as used in the present document, terms such as "linear", "equal", "parallel", "half" and "same" should not be interpreted in a rigid or purely mathematical manner. For example, "linear" should not be interpreted to require a perfect geometric line, "parallel"

should not be interpreted in strict geometric sense, and "equal" should not be interpreted to be perfectly mathematically equal. Rather, these terms should be interpreted within tolerances that would be understood by one of ordinary skill in the art.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A system, comprising
   a first light-emitting diode (LED) lighting apparatus configured to illuminate at least portion of a structure, the first LED lighting apparatus comprising:
   a first array of light emitting diodes (LEDs) having a first length, wherein the first array of LEDs comprises:
   a first plurality of LEDs configured to produce a first light having a first color temperature, wherein the first plurality of LEDs aligns within a first linear shape;
   a second plurality of LEDs configured to produce a second light having a second color temperature different from the first color temperature, wherein the second plurality of LEDs align within a second linear shape;
   a first driver circuit configured to output a first plurality of currents;
   a first switch assembly configured to cause the first driver circuit to output one of the first plurality of currents to the first plurality of LEDs in response to being set at a first position, to the second plurality of LEDs, or both; and
   a second light-emitting diode (LED) lighting apparatus configured to illuminate the at least portion of the structure, the second LED lighting apparatus comprising:
   a second array of light emitting diodes (LEDs) having a second length different than the first length by a scale factor, wherein the second array of LEDs comprises:
   a third plurality of LEDs configured to produce a third light having the first color temperature, wherein the third plurality of LEDs aligns within a third linear shape;
   a fourth plurality of LEDs configured to produce a fourth light having the second color temperature, wherein the fourth plurality of LEDs align within a fourth linear shape;
   a second driver circuit configured to output a second plurality of currents, wherein each current of the second plurality of currents is greater than or less than a respective current of the first plurality of currents by the scale factor; and
   a second switch assembly configured to cause the second driver circuit to output one of the second plurality of currents to the third plurality of LEDs in response to being set at a second position corresponding to the first position of the first switch assembly, to the fourth plurality of LEDs, or both, wherein each LED of the third plurality of LEDs or each LED of the fourth plurality of LEDs is configured to receive an amount of current substantially equal to each LED of the first plurality of LEDs or each LED of the second plurality of LEDs in response to the first driver circuit outputting the one of the first plurality of currents and the second driver circuit outputting the one of the second plurality of currents.

2. The system of claim 1, wherein the first LED lighting apparatus is configured to electrically couple to the second LED lighting apparatus.

3. The system of claim 1, wherein the first LED lighting apparatus is configured to electrically couple to the second LED lighting apparatus via a receptacle.

4. The system of claim 1, wherein the first switch assembly comprises a plurality of selectable positions including the first position.

5. The system of claim 1, wherein the first LED lighting apparatus comprises a third switch assembly comprising a plurality of selectable positions including:
   a third position configured to cause the third switch assembly to couple the one of the first plurality of currents to the first plurality of LEDs;
   a fourth position configured to cause the third switch assembly to couple the one of the first plurality of currents to the second plurality of LEDs; and
   a fifth position configured to cause the third switch assembly to couple a first portion of the one of the first plurality of currents to the first plurality of LEDs and a second portion of the one of the first plurality of currents to the second plurality of LEDs.

6. The system of claim 1, wherein the first color temperature corresponds to 3000 Kelvin and the second color temperature corresponds to 4000 Kelvin.

7. The system of claim 1, wherein the first switch assembly comprises a plurality of selectable positions, wherein each of the plurality of selectable positions is configured to cause the first switch assembly to send a respective signal to the first driver circuit, wherein the respective signal is configured to cause the first driver circuit to output a respective one of the first plurality of currents that corresponds to a current position of the plurality of selectable positions.

8. The system of claim 1, wherein the first LED apparatus comprises a housing comprising an interior volume configured to hold the first driver circuit, the first plurality of LEDs, and the second plurality of LEDs.

9. The system of claim 8, wherein the first switch assembly is configured to be positioned in a receptacle of the housing, and wherein the first switch assembly is configured to be flush with a surface of the housing when positioned in the receptacle.

10. A linear light-emitting diode (LED) lighting system, comprising:
    a first modular lighting apparatus traversing a first linear distance, wherein the first modular lighting apparatus comprises:

a first plurality of light-emitting diodes (LEDs) arranged within a first linear form factor and having a first number of LEDs, each LED of the first plurality of LEDS associated with a first color temperature;
a first driver circuit configured to output a first plurality of currents;
a first switch assembly configured to:
cause the first driver circuit to output one of the first plurality of currents in response to the first switch assembly being set to a first position; and
couple the one of the first plurality of currents to the first plurality of LEDs; and
a second modular lighting apparatus traversing a second linear distance that is longer than the first linear distance, wherein the second modular lighting apparatus comprises:
a second plurality of light-emitting diodes (LEDs) arranged within a second linear form factor and having a second number of LEDs, each LED of the second plurality of LEDs associated with the first color temperature, wherein the second number is greater than the first number by a scale factor;
a second driver circuit configured to output a second plurality of currents;
a second switch assembly configured to:
cause the second driver circuit to output one of the second plurality of currents in response to the second switch assembly being set to a second position corresponding to the first position of the first switch assembly; and
couple the one of the second plurality of currents to the second plurality of LEDs, wherein the one of the second plurality of currents is greater than the one of the first plurality of currents by the scale factor, wherein each LED of the first plurality of LEDs is configured to receive an amount of current substantially equal to each LED of the second plurality of LEDS in response to the first driver circuit outputting the one of the first plurality of currents and the second driver circuit outputting the one of the second plurality of currents.

11. The linear LED lighting system of claim 10, wherein the first switch assembly is configured to receive a signal to cause the first driver circuit to output the one of the first plurality of currents.

12. The linear LED lighting system of claim 11, wherein the signal is received via a wired connection.

13. The linear LED lighting system of claim 11, wherein the signal is received via a mechanical switch.

14. The linear LED lighting system of claim 11, wherein the signal comprises a wireless signal.

15. The linear LED lighting system of claim 10, wherein the first driver circuit comprises a current regulator.

16. The linear LED lighting system of claim 10, wherein the first modular lighting apparatus and the second modular lighting apparatus are configured to be fixed to a ceiling.

17. A linear light-emitting diode (LED) system, comprising:
a first modular lighting apparatus having a first length, wherein the first modular lighting apparatus comprises:
a first array of light emitting diodes (LEDs) comprising:
a first plurality of LEDs associated with a first color temperature, wherein the first plurality of LEDs aligns within a first linear shape;
a second plurality of LEDs associated with a second color temperature different from the first color temperature, wherein the second plurality of LEDs aligns within a second linear shape parallel with the first linear shape;
a first driver circuit configured to output a first plurality of currents to the first plurality of LEDs, the second plurality of LEDs, or both; and
a second modular lighting apparatus having a second length greater than the first length by a scale factor, wherein the second modular lighting apparatus comprises:
a second array of light emitting diodes (LEDs) comprising:
a third plurality of LEDs associated with a third color temperature, wherein the third plurality of LEDs aligns within a third linear shape, wherein the third color temperature matches the first color temperature, and wherein the third plurality of LEDs is longer than the first plurality of LEDs;
a fourth plurality of LEDs associated with a fourth color temperature matching the second color temperature, wherein the fourth plurality of LEDs aligns within a fourth linear shape parallel with the third linear shape, and wherein the fourth plurality of LEDs is longer than the second plurality of LEDs;
a second driver circuit configured to output a second plurality of currents the third plurality of LEDs, the fourth plurality of LEDs, or both, wherein each of the second plurality of currents is greater than a respective current of the first plurality of currents by the scale factor, and wherein each LED of the third plurality of LEDs or each LED of the fourth plurality of LEDs is configured to receive an amount of current substantially equal to each LED of the first plurality of LEDs or each LED of the second plurality of LEDs in response to the first driver circuit outputting a first current of the first plurality of currents and the second driver circuit outputting a second current of the second plurality of currents, wherein the second current is greater than the first current by the scale factor.

18. The linear LED system of claim 17, wherein the first modular lighting apparatus comprises a first connector configured to couple to a second connector part of the second modular lighting apparatus, wherein the first connector and second connector are configured to transmit data between the first modular light apparatus and the second modular lighting apparatus.

19. The linear LED system of claim 17, wherein the scale factor matches a ratio of a first number of LEDs in the third plurality of LEDs to a second number of LEDs in the first plurality of LEDs.

* * * * *